E. W. CUNNINGHAM.
UNIVERSAL TEMPLET FOR STRUCTURAL STEEL WORK.
APPLICATION FILED AUG. 18, 1920.

1,382,271.

Patented June 21, 1921.

3 SHEETS—SHEET 1.

Inventor
E. W. Cunningham
Davis & Davis
his Attorneys

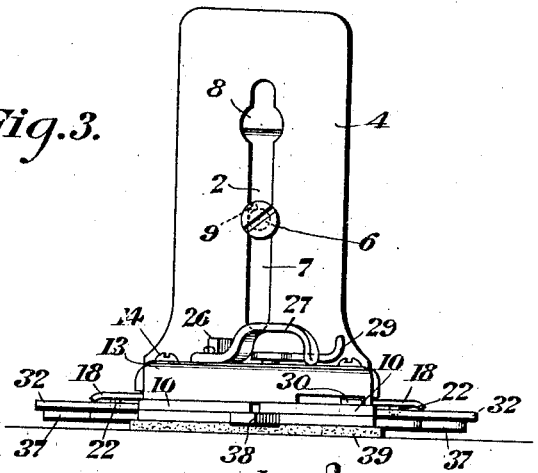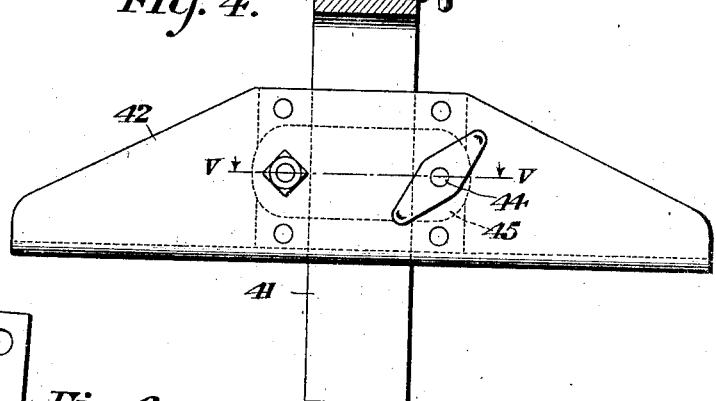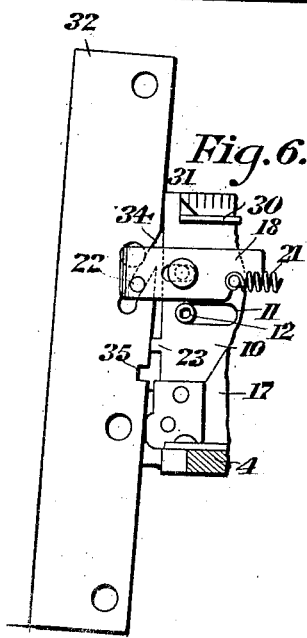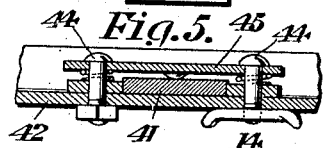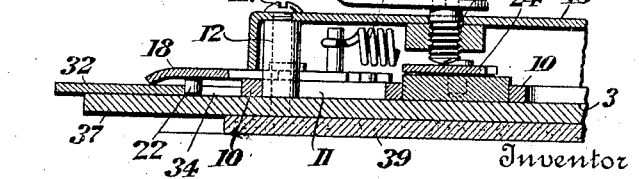

E. W. CUNNINGHAM.
UNIVERSAL TEMPLET FOR STRUCTURAL STEEL WORK.
APPLICATION FILED AUG. 18, 1920.

1,382,271.

Patented June 21, 1921.

3 SHEETS—SHEET 3.

Inventor
E. W. Cunningham
By Davis & Davis
his Attorneys

UNITED STATES PATENT OFFICE.

EDGAR W. CUNNINGHAM, OF NEW BRUNSWICK, NEW JERSEY.

UNIVERSAL TEMPLET FOR STRUCTURAL-STEEL WORK.

1,382,271. Specification of Letters Patent. Patented June 21, 1921.

Application filed August 18, 1920. Serial No. 404,369.

*To all whom it may concern:*

Be it known that I, EDGAR W. CUNNINGHAM, a citizen of the United States, and resident of New Brunswick, in the county of Middlesex and State of New Jersey, have invented certain new and useful Improvements in Universal Templets for Structural-Steel Work, of which the following is a specification.

In fabricating beams and girders and other structural steel members, it is nearly always necessary to form groups of perforations to receive bolts or rivets. These groups of perforations are usually arranged in parallel lines with the perforations equal distances apart in each line. These groups of perforations are placed measured distances from the ends of the beam or girder, and measured distances from the girder or beam flanges. It is the ordinary practice for skilled workmen to carefully measure off the beam and to carefully plot and mark, by means of a center punch, the spots where the perforations are to be made. This work must be very carefully done in order that when the beams are assembled in the completed structure the groups of perforations in the connected members will accurately register.

It is one of the main objects of this invention to provide a tool by means of which groups of perforations may be quickly and accurately marked on a beam or girder or other member of a fabricated steel structure, and whereby all the groups marked by means of this tool will be precisely alike and accurately spaced.

Another object of the invention is to provide a tool adapted to receive templets having the desired grouping of perforations, and to provide means whereby the templet holders may be adjusted toward or from each other to vary the spacing between the perforations of each templet plate.

Another important object of the invention is to provide a tool having a templet-holding head and an adjustable T-head adapted to engage the edge of a girder or other structural steel member for the purpose of accurately spacing the templet head in proper position on the web of the girder.

There are other important objects and advantages of the invention which will appear fully hereinafter.

Figure 1:
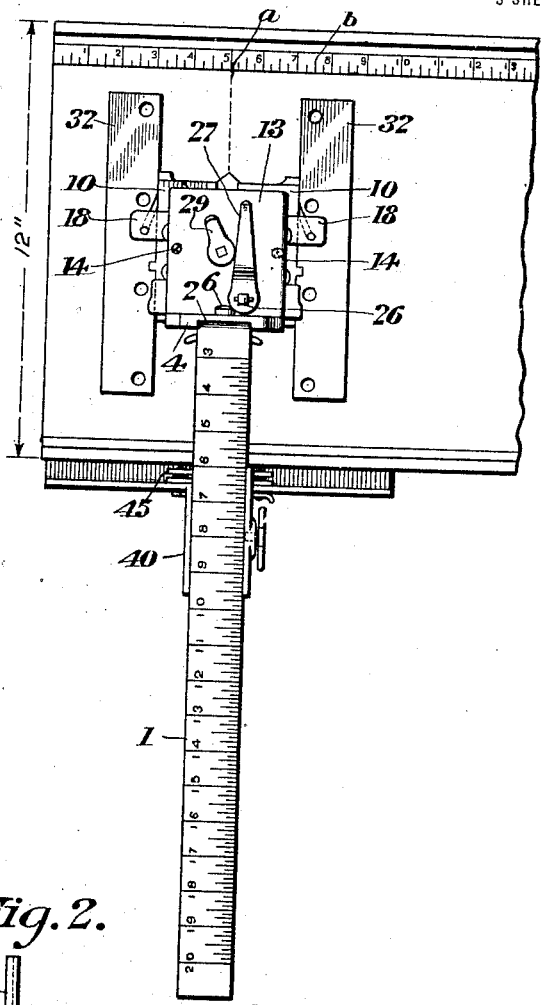
Figure 2:
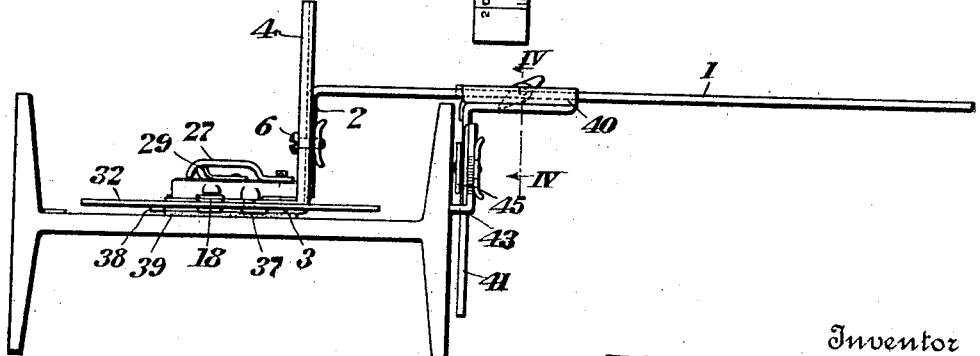
Figure 8:
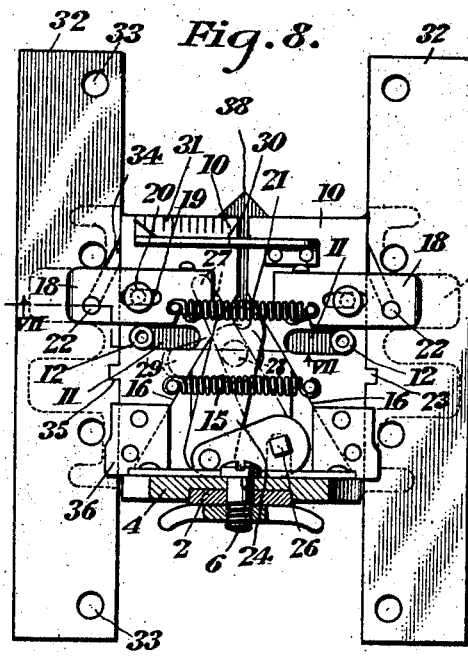
Figure 9:
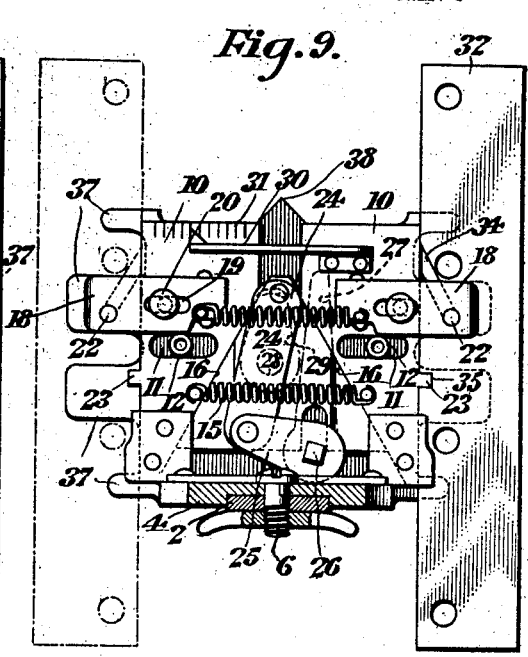
Figure 10:
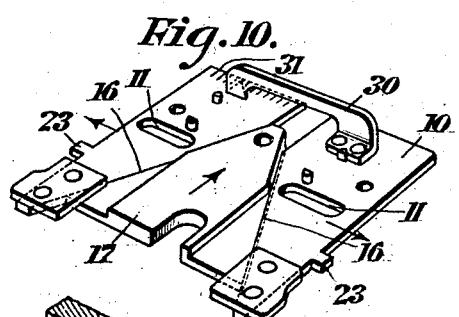
Figure 11:
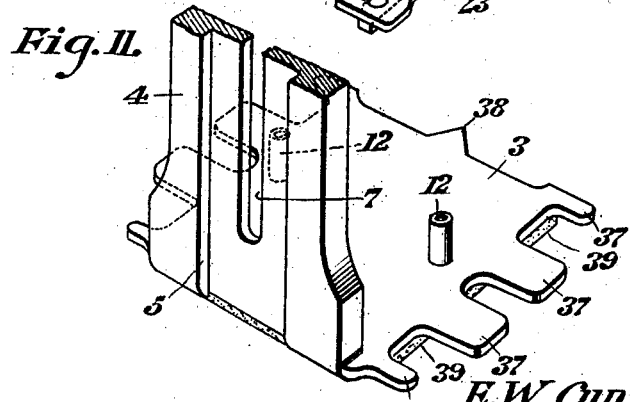

In the drawings, Figure 1 is a plan view of the device applied to the end of a girder, the templet plates being in position to indicate the positions of the perforations to be formed in the girder web;

Fig. 2 a side elevation of the device applied as illustrated in Fig. 1, the girder being in end elevation;

Fig. 3 an end elevation of the device;

Fig. 4 a vertical section through the scale bar, taken on the line IV—IV of Fig. 2;

Fig. 5 a detail sectional view of the T-head taken on the line V—V of Fig. 4;

Fig. 6 a detail view showing the manner of securing the templet plates to the templet holder;

Fig. 7 a detail sectional view through a portion of the templet head, taken on the line VII—VII of Fig. 8;

Fig. 8 a detail plan view of the templet head with the covering removed and the vertical member of the templet bar in horizontal sectional view;

Fig. 9 a view similar to Fig 8, the templet plate holders being shown in a different position;

Fig. 10 a detail perspective view of the templet plate holders and the expanding cam; and Fig. 11 a detail perspective view, partly in section, of the base plate of the templet head.

Referring to the various parts by numerals, 1 designates the main scale bar, which also constitutes the main body of the tool and on which the several devices are mounted. One end of this scale bar is bent downwardly to form a supporting arm 2. The base 3 of the templet head is formed at one side with an upstanding post 4. This post is grooved on its outer side as at 5, to receive the arm 2, and is slotted vertically at 7 to receive a clamping screw 6 which passes through said slot and is mounted in the supporting arm 2. The upper end of the slot 7 is enlarged as shown at 8, to permit the head of the clamping screw to be passed therethrough as a convenient means for connecting and disconnecting the templet head to the scale bar. The clamping screw 6 is provided with a lug 9 shown in dotted lines in Fig. 3, which fits within the slot 7 and prevents the rotation of the screw 6 in the slot 7.

Slidably mounted on the upper surface of the base of the templet head are two plates 10 which constitute templet holders. Each plate is slotted at 11 and is held in position on the base by a post 12 secured to the base and passing upwardly through said slot. The upper ends of these posts are connected to the cover plate 13 by means of screws 14. The templet holding plates are connected together by a coil spring 15, shown clearly in Figs. 8 and 9, said spring tending to draw the plates inwardly and to hold them with the outer walls of the slots in engagement with the posts 12 as indicated in Fig. 8 of the drawings. The inner edges of these templet holding plates are beveled as at 16, indicated in Fig. 10, and between said beveled portions is arranged a correspondingly beveled or tapered expanding cam 17, said cam being so arranged that when forced forwardly between the templet holders said holders will be separated or expanded, the spring 15 yielding and permitting this movement of the plates 10.

Mounted on each plate 10 is a templet clamp 18, said clamp extending laterally beyond the side edge of the plate 10 and beyond the edge of the templet head, as indicated clearly in Figs. 1 and 3. These templet clamps are in the form of short bars which are slotted at 19 and connected to the plates 10 by means of screws 20 which pass through said slots. The two clamps 18 are connected together across the templet head by means of a coil spring 21 which tends to draw said clamp plates inwardly. Each clamp is provided with a downwardly extending pin 22 which is adapted to be engaged in a suitable slot in the templet plate, as will be more fully hereinafter described. Each of the templet holding plates 10 is formed on its outer side edge with an outwardly extending rectangular lug 23 which is adapted to enter a correspondingly shaped notch in the inner edge of the templet plate, as will be more fully hereinafter described.

The means for moving the expanding cam consists of a link 24 pivoted to the forward contracted end of the cam, its other end being pivotally connected to a crank arm 25 secured to a shaft 26 mounted in the templet head. To this shaft, above the cover 13, is secured an operating lever 27, shown clearly in Fig. 1, and in dotted lines in Figs. 8 and 9. By moving this lever toward the right hand as viewed in Fig. 8, the expanding cam 15 will be forced in between the plates 10 and said plates forced outwardly as indicated in Fig. 9, against the tension of the spring 15. In order to lock the templet holding plates in their adjusted position a clamping screw 28 is threaded in the cover 13, the lower end of said screw being arranged to bind on the link 24 and to thereby hold the expanding cam in its adjusted position against the tension of the spring 15. The upper end of the clamping screw is provided with an operating finger 29; and this clamping screw is so arranged that a partial rotation of the screw will cause it to hold the link 24 in its adjusted position. One of the templet holding plates is provided with an indicator point 30, and the other plate is provided with a scale 31. By means of this pointer and scale the desired adjustment between the templet holding plates may be accurately gaged.

The templets shown in the drawings consist of narrow bar-like plates 32 provided with four apertures 33 spaced equal distances apart along the inner edge thereof. The inner edge of each plate 32 is formed with an inwardly extending inclined slot 34, and with a rectangular notch 35. The inclined slot is adapted to receive the pin 22 on one of the clamping bars 18, and the notch 35 is adapted to receive the rectangular lug 23 of the holding plate. In Fig. 6 is illustrated the manner of connecting the templet plates with the clamp plates 18 and the plates 10. The templet is inclined slightly and the pin 22 entered in the inclined slot 34. The plate is then forced along, the clamp plate 18 being drawn outwardly until the pin 22 rests at the inner end of the slot 34. The notch 35 will then be in a position to receive the rectangular lug 23, and the spring 21 will then draw the clamping bar 18 and the templet inwardly close against the edge of the templet holder 10. To detach the templets from the holders it is only necessary to draw one end outwardly sufficiently to free the notch 35 from the lug 23 and to then move the plate longitudinally until the pin 22 is detached from the slot 34. By this means templet plates of any desired pattern may be readily connected to the holders; and when in position, are accurately held against the straight outer edge of the holding plate 10. Each templet holding plate is provided, at its inner end, that is to say near the upstanding post 4, with an over-hanging holding lug 36 which is adapted to engage the upper surface of the templet plate and to serve as an additional means for holding the templet in horizontal alinement with the plates 10. The base of the templet head is formed, on its opposite side edges and directly under the templets, with outwardly extending supporting lugs 37 on which the templet plates rest. These lugs are extended outwardly sufficiently to form a substantial support for the templet plates in all their adjusted positions. The base of the templet head is also formed at its forward edge with a center-point indicator 38; and on its under side it is provided with a leather or other soft pad 39.

Adjustably mounted on the scale bar 1 is a slide 40 which carries a depending arm 41. Vertically adjustable on this arm is a broad T-head 42 provided at its lower edge with an outwardly turned flange 43 which forms a long straight edge adapted to be brought squarely into contact with the edge of the girder or other structural member in which perforations are to be made. This T-head is adapted to be clamped to the arm 41 by means of a screw clamp 44. This clamp may be of any suitable construction. As shown, it consists of a bar 45 adapted to be brought into engagement with the arm 41 by suitable clamp screws.

The manner of using the device may be briefly described as follows:

The workman first stretches a steel tape along the girder or other structural member in which the perforations are to be made. The center of the group of perforations is marked at the required place as indicated by the dotted line $a$ in Fig. 1 extending transversely of the girder. The scale on the scale bar is marked off from the center of the templet head so that the workman knows that the scale marks indicate the distance from the center of said head. The workman, knowing the depth of the girder, adjusts the T-head on the scale bar to such position that the templet head will be placed in the desired position on the web of the girder. As indicated in Fig. 1, the girder is assumed to be 12 inches in depth. In order to place the center of the templet head at the center of the web the T-head is adjusted to bring its straight edge 43 directly in line with the scale mark on the scale bar indicating 6 inches. The templet head is then adjusted vertically to bring the base pad 39 of the head on the web of the girder, as indicated in Fig. 2. The templet plates giving the desired number of perforations spaced the desired distances apart, are attached to the templet plate holders. The operating lever 27 is then moved to expand the templet plate holders to give the required distance between the templet plates, and the holders are then locked by means of the clamping screw 28. This operation will give the workman a tool properly adjusted to mark the desired group of perforations in the girder web, and thereafter the only care that need be exercised is the marking of the transverse center lines $a$ in the proper positions, and then placing the center-point indicator 38 on said lines. The points at which the perforations are to be made are preferably marked by means of a center punch placed in the perforations 33 in the templet plates.

It is manifest that any desired groupings of perforations may be secured by securing the properly constructed templet plates in the templet holder. In structural steel work the groupings of perforations are standardized and it will be necessary for each workman to have a very limited number of templet plates in order to mark off the perforations for any standard construction.

The steel tape is indicated at $b$ in Fig. 1.

It is manifest that the tool may be used by placing the T-head on the end of a girder as well as by placing it on the flange thereof. The templet head is adjustable vertically in order to adapt it for use with girders having various depths of flanges, and the T-head is vertically adjustable for the same purpose.

What I claim is:

1. A device for marking perforations in structural steel members, comprising a scale bar, a templet head secured thereto, templet plate holders adjustably mounted in said head, and a T-head adjustably mounted on said scale bar.

2. A device for marking structural steel members, comprising a scale bar, a straight edge adjustably mounted on said bar, a templet head secured to said bar, and templet plate holders adjustably mounted in said head.

3. A device for marking structural steel members, comprising a scale bar, a straight edge adjustably mounted on said bar, a templet head adjustably secured to said bar, and templet plate holders adjustably mounted in said head.

4. A device for marking perforations in structural steel members, comprising a supporting bar, a straight edge adjustably mounted on said supporting bar, a templet head secured to one end of said bar, a pair of templet plate holders mounted in said head, means for adjusting said templet holders toward and from each other, a pair of templet plates, and means for detachably connecting said templet plates to the templet holders.

5. A device for marking perforations in structural steel members, comprising a scale bar, a T-head adjustably mounted thereon, a templet head secured to one end of said bar, a pair of laterally slidable templet holders mounted in said head, means for forcing said templet holders inwardly toward each other, an expanding device mounted in the head and adapted to engage said templet holders to force them outwardly away from each other, means for locking said expanding means, and means for clamping templet plates to said templet holders.

6. The combination of a scale bar having one end bent to form a supporting arm, a templet head adjustably mounted on said supporting arm, adjustable templet plate holders mounted in said head, and a T-head adjustably mounted on the scale bar.

7. The combination of a scale bar, a templet head mounted on one end thereof, a pair of templet plate holders mounted in said head, means for yieldingly holding said templet plate holders in their inner position, an expanding cam mounted between said templet plate holders, means for moving said cam to force the templet plate holders outwardly away from each other, and means for detachably clamping the templet plates to said holders.

8. The combination of a scale bar, a supporting arm formed on one end thereof, a templet head adjustable on said supporting arm and formed with a base plate, a pair of slidable templet holder plates mounted on said base, a spring connecting said plates together, an expanding cam mounted between said plates, means for moving said cam to force said plates outwardly away from each other, a templet plate clamping means carried by each templet holder, and means for locking the expanding cam in its adjusted position.

9. The combination of a scale bar, a supporting arm formed at one end thereof, a transversely extending straight edge mounted on said scale bar, means for adjusting said straight edge on said scale bar, a templet head secured to one end of said scale bar and formed with a flat base plate, a pair of templet holding plates slidably mounted on said base plate, a spring connecting said holder plates together, a tapered expanding cam mounted on the base plate between the templet holding plates, means for projecting said expanding cam forwardly to move the templet holding plates away from each other, means for locking said expanding cam in its adjusted position, a spring clamp carried by each templet holding plate, and a templet plate adapted to be held by each of said clamps.

10. A device for marking structural steel members comprising a supporting bar, a templet head secured to said bar, templet plate holders mounted in said head, and means for adjusting said plate holders outwardly to vary the distance between the templet plates carried thereby.

In testimony whereof I hereunto affix my signature.

EDGAR W. CUNNINGHAM.